United States Patent [19]

Shannon

[11] 4,316,389
[45] Feb. 23, 1982

[54] RATE OF TURN INDICATOR

[76] Inventor: E. Paul Shannon, Rte. 2, Box 249, Killen, Ala. 35645

[21] Appl. No.: 103,355

[22] Filed: Dec. 13, 1979

[51] Int. Cl.³ .................. G01C 19/06; G01C 19/42
[52] U.S. Cl. .................................. 73/504; 74/5.6 E
[58] Field of Search ............... 73/504; 74/5 R, 5 F, 74/5.6 E

[56] References Cited

U.S. PATENT DOCUMENTS

| | | | |
|---|---|---|---|
| 2,602,239 | 7/1952 | Wrigley | 73/504 |
| 2,815,584 | 12/1957 | Watson | 74/5.7 X |
| 2,951,377 | 9/1960 | Lahde | 74/5.6 E |
| 4,147,063 | 4/1979 | Bower et al. | 73/504 |
| 4,179,087 | 12/1979 | Johnson | 74/5.6 D |

Primary Examiner—James J. Gill
Attorney, Agent, or Firm—Hugh D. Jaeger

[57] ABSTRACT

Rate of turn indicator for a nautical vessel, aircraft, and the like indicating the rate of turn or swing in units such as degrees per unit of time from a particular course of travel. The indicator includes a magnetic gyro wheel including a flexible hub rotating about an axis on the same plane as the course of travel and electromagnetic sensing coils receiving the deviations of strength of the electromagnetic field of the magnetic gyro wheel from an axis on turning from the course of travel. The magnetic gyro wheel includes a plurality of permanent magnets of alternating poles positioned about a circumferential axis of a circular member, and a flexible hub material affixed to the interior diameter of the circular member. The hub is affixed to an axially supported shaft. Adjusting bolts provide for adjusting the distance of the flexible hub magnetic gyro wheel from the electromagnetic sensing coils. The rate of turn indicator includes a high/low sensitivity switch for adjusting a meter connected to the electromagnetic sensing coils through electrical circuitry and a potentiometer for zeroing the meter where the meter indicates the rate of turn.

14 Claims, 9 Drawing Figures

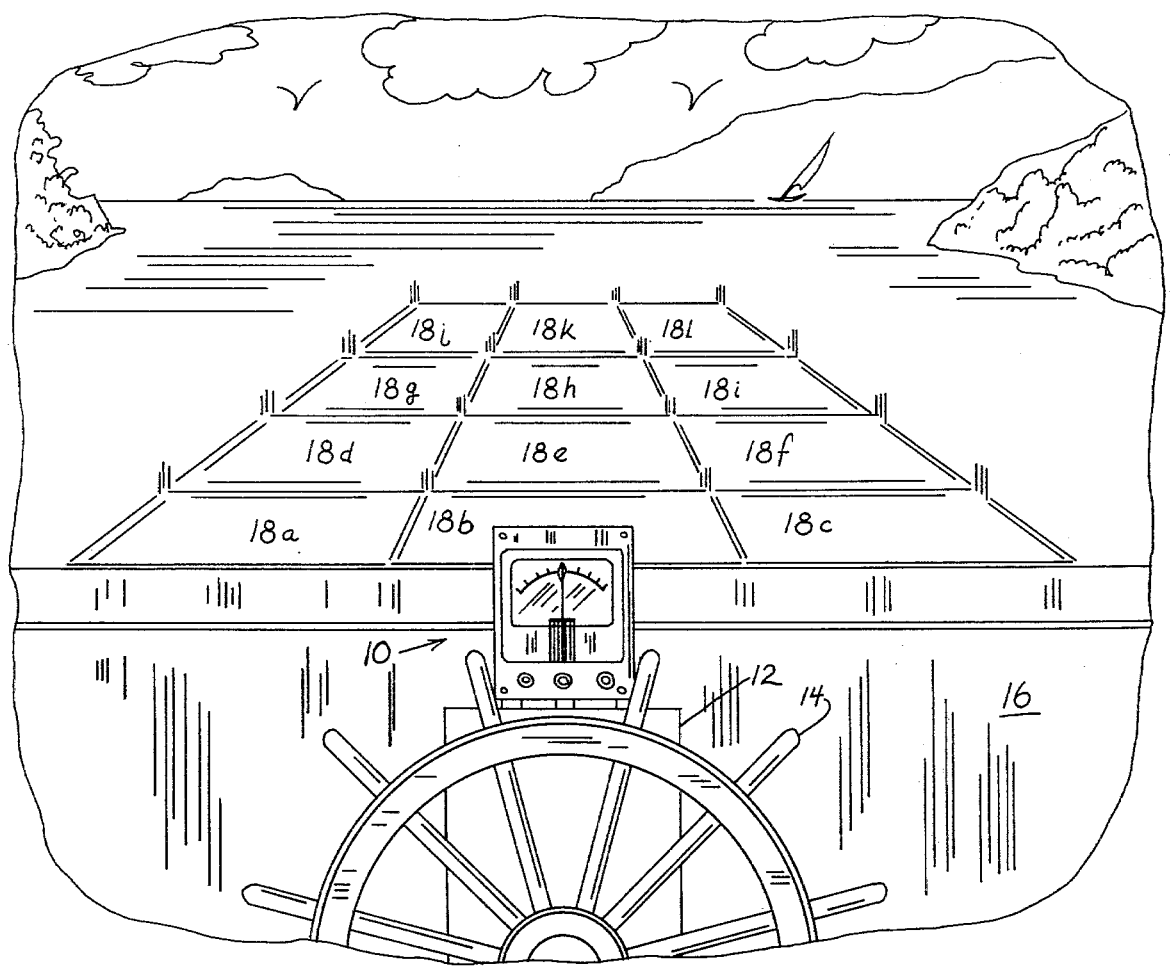
FIG. 1
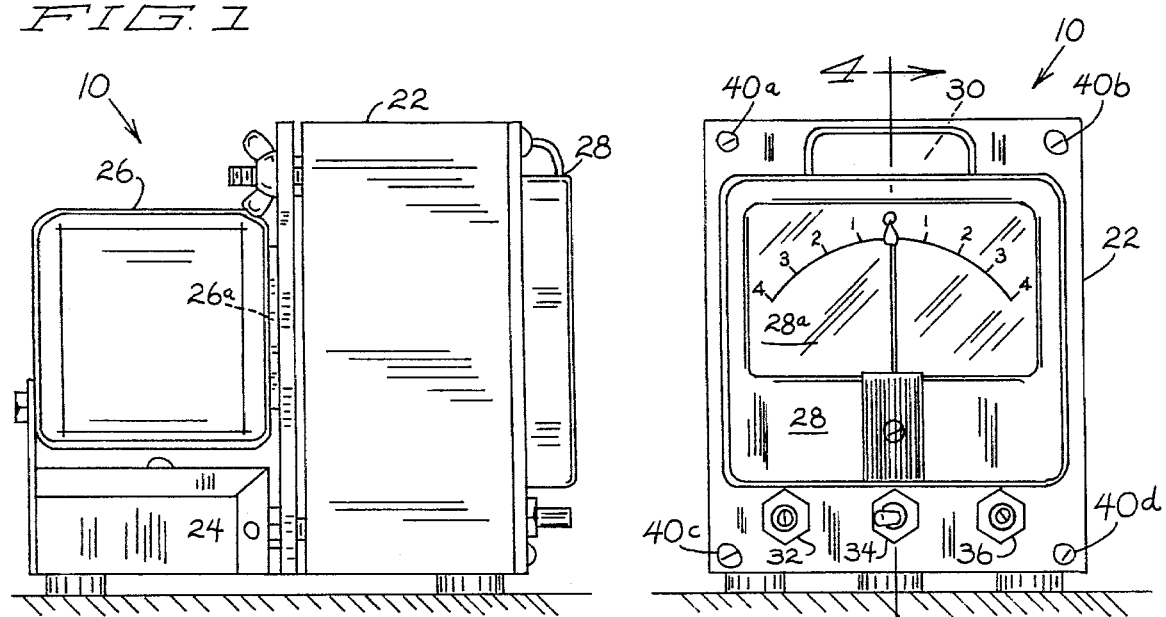
FIG. 2
FIG. 3

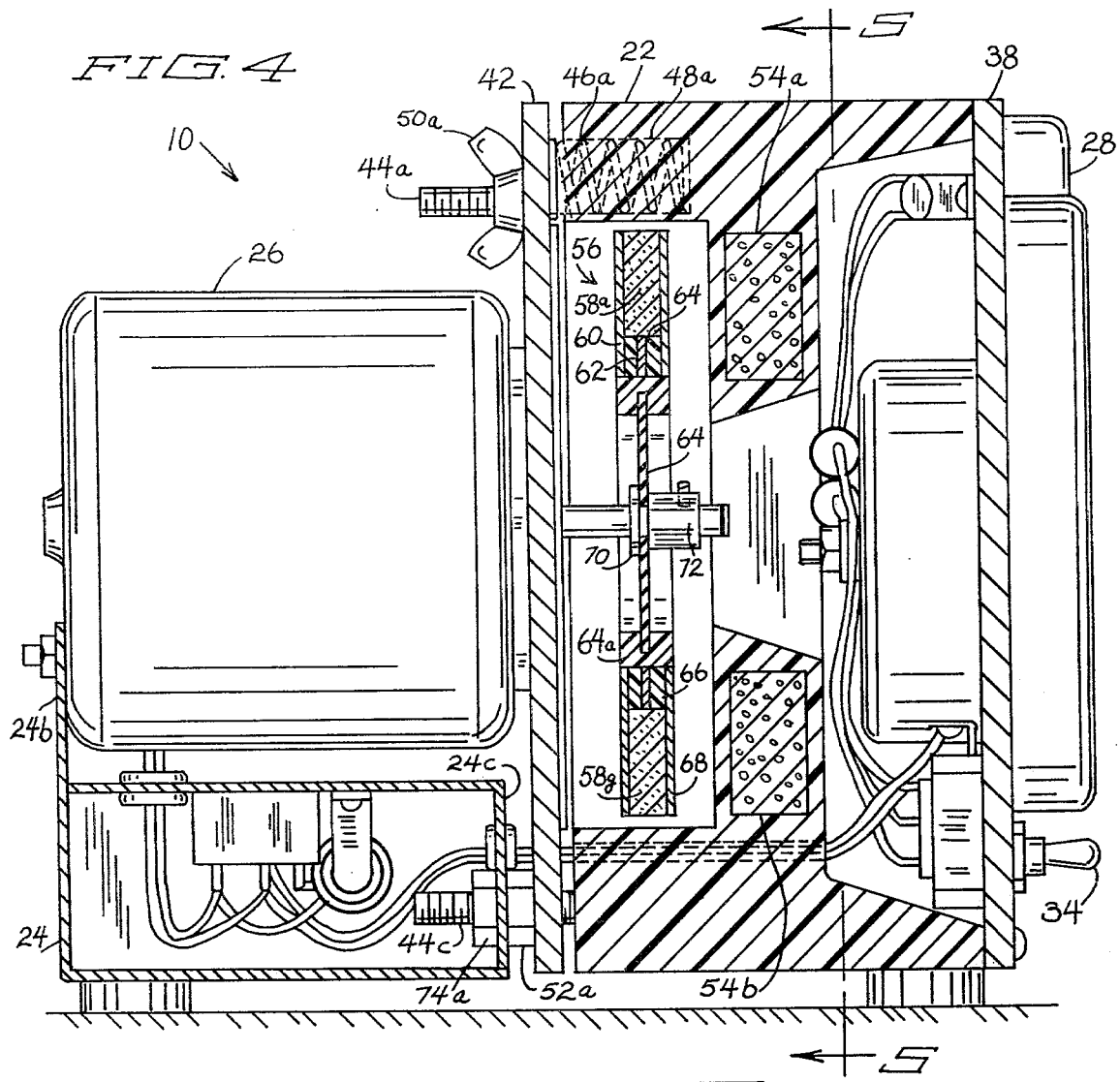
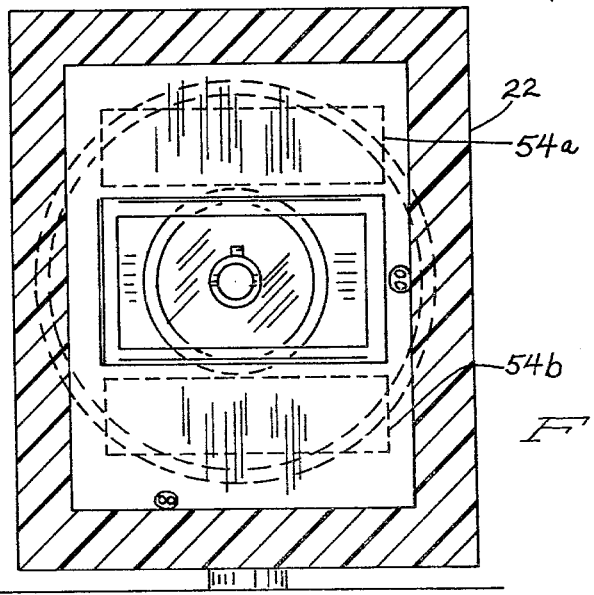

RATE OF TURN INDICATOR

BACKGROUND OF THE INVENTION

1. Field of the Invention

The present invention relates to a navigation aid or nautical instrument, and, more particularly, pertains to a rate of turn indicator for indicating the rate of turn from a course of travel for a vessel or other like vehicle.

2. Description of Prior Art

One of the most critical problems confronting the shipping industry, particularly tow-boats, is steering a vessel on a straight and true course without swinging or turning from the predetermined course due to forces of nature such as winds, tides, waves, etc.

Prior art gyroscopic instruments have been very expensive. The prior art gyros are usually complex, expensive, electromechanical instruments with numerous mechanical components subject to structural failure in addition to electrical failure. The prior art instruments have included components such as gears, springs, rotors and brushes, centrifugal switches, all of which are subject to failure. Finally, the instruments had circuitry which sparked and could be hazardous in explosive environments. In any event, if the instruments are purchased, after a costly financial outlay by an operator, the installation, subsequent maintenance, and repair are expensive.

The present invention overcomes the disadvantages of prior art by providing a rate of turn indicator having easy visual readout for a steersman of a vessel that a rate of turn or swing is occurring, and yet sensitive and accurate to the rate of turn while eliminating prior art problems due to friction between components.

SUMMARY OF THE INVENTION

The present invention provides a rate of turn indicator for visually indicating the rate of turn or swing from a course of travel on a zero-center meter positioned on the face of the rate of turn indicator. This meter indication provides visual information to the steersman of the vessel indicating that the vessel is being subjected to a turning motion either to the left or the right, and also provides visual indication for bringing the vessel back onto a straight course if desired.

According to one embodiment of the present invention, there is provided a rate of turn indicator including a motor axially rotating a flexible-hub magnetic gyro wheel, electromagnetic sensing coils adjacent to the magnetic gyro wheel and diametrically opposed to each other, and electrical circuitry connected between the coils and a zero-center meter whereby the rotating flexible-hub magnetic gyro wheel induces a current in both coils which drives the meter to one side of center indicating a rate of turn or swing from a course of travel of the vessel. The magnetic gyro wheel includes a hub of flexible material having properties which provide for axial rotation and flexible lateral movement. The magnetic gyro wheel supports at least one pair of permanent magnets, and, as disclosed, a plurality of permanent magnets of alternating poles circumferentially spaced around the flexible hub of the magnetic gyro wheel. Mechanical adjustment structures are provided for adjusting the distance of the magnetic gyro wheel from the electromagnetic sensing coils providing for coarse adjustment of zero centering of the meter along with a potentiometer providing for fine adjustment of the meter. Electrical circuitry is provided for high and low sensitivity of the meter indicating rate of turn or swing from the present course of travel.

One significant aspect and feature of the present invention is a rate of turn indicator which provides direct visual indication to a steersman of a vessel or other like vehicle that a rate of turn or swing is occurring from a course of travel in an angular direction as indicated by the swing of a meter needle from the zero center on the face of a meter. This rate of turn or swing is an easily identifiable visual indication to the steersman of the vessel and provides direct, easily observable indication that a rate of turn or swing is occurring in proportion to the deflection of the meter needle from the zero center on the meter face providing for compensation by the steersman of the vessel. The zero center position of the meter is very important, especially when docking a vessel in inland waterways.

Another significant aspect and feature of the present invention is a rate of turn indicator which is of minimal complexity and has only two moving parts, the flexible-hub magnetic gyro wheel and the meter movement. The present invention relies on the recognition of principles of gyroscopic action, magnetic principles, conduction of currents, and electrical circuitry resulting in a navigational instrument which provides for visual indication of rate of turn or swing from a particular course of travel. The flexible-hub magnetic gyro wheel is axially rotated by a motor. The rate of turn indicator is a substantially linear instrument.

A further significant aspect and feature of the present invention is a rate of turn indicator which can be moved from position to position within a wheelhouse, or carried between wheelhouses of vessels and only needs be set upon a substantially flat surface, usually within the view of a steersman of a vessel and in view from the steering position of the vessel. No alignment of the instrument is necessary except for centering of the meter with the zero-center control with the fine adjustment. If coarse adjustment is required for the rate of turn indicator, it is only necessary to adjust wing nuts on bolts thereby moving the position of the electromagnetic sensing coils with respect to the magnetic gyro wheel. The instrument is of a compact physical size requiring minimal space and of a desirable small weight not presenting a burdensome weight restriction. Finally, the rate of turn indicator as disclosed can easily operate from the vessel's current.

Having described the present invention, it is a principal objective hereof in providing a rate of turn indicator.

One objective of the present invention is to provide a rate of turn indicator having direct visual readout of the rate of turn or swing from a course of travel which is visually perceived and understandable by a steersman of a vessel or other like vehicle. The navigational instrument being the rate of turn indicator visually displays the information readily readable on a meter face of the instrument, and corresponds proportionally to the angular turn or swing of the vessel, which may include a tow of barges or just a vessel itself, such as a towboat, freighter, tanker, or other like vehicle.

Still another objective of the present invention is to provide a rate of turn indicator utilizing a magnetic gyro wheel of novel construction with minimal components, especially friction components, and of economical feasibility. One requirement is that the flexible-hub magnetic gyro wheel is axially rotated about a radial axis but yet also is flexible providing for lateral movement corresponding to the angular directional turn of a vessel or like vehicle. The magnetic gyro wheel meets this objective by providing a plurality of permanent magnetic domains of alternating poles spaced about an outer periphery of a circumferential, flexible hub member having axial stiffness but lateral flexibility providing for gyroscopic action of the magnetic poles of the magnetic gyro wheel occurring on account of variation from the course of steerage.

A further objective of the present invention is a rate of turn indicator which provides the steersman of the vessel the ability to steer a straight course while indicating any deviation or variation from that course, thus saving energy of the vessel in steering a straight course and further—and most importantly—protecting life and property. The rate of turn indicator indicates the slightest variation from a straight course, and upon that variation occurring, visually displays this information on the face of the meter. This information can be interpreted by the steersman of a vessel instantaneously providing for correction of the course, thus saving energy and protecting life and property on the water. The environment is also protected from undue spills of cargoes such as oil or dangerous chemicals.

BRIEF DESCRIPTION OF THE DRAWINGS

Other objects and many of the attendant advantages to this invention will be readily appreciated as the same becomes better understood by reference to the following detailed description when considered in connection with the accompanying drawings, in which like reference numerals designate like parts throughout the FIGURES thereof and wherein:

FIG. 1 illustrates a front view through a pilothouse window of a towboat showing a rate of turn indicator, the present invention, in a convenient viewing position of a wheel;

FIG. 2 illustrates a side view of the rate of turn indicator;

FIG. 3 illustrates a front view of the rate of turn indicator;

FIG. 4 illustrates a sectional view taken along line 4—4 of FIG. 3;

FIG. 5 illustrates a sectional view taken along line 5—5 of FIG. 4;

DESCRIPTION OF ONE EMBODIMENT

Figure 6:
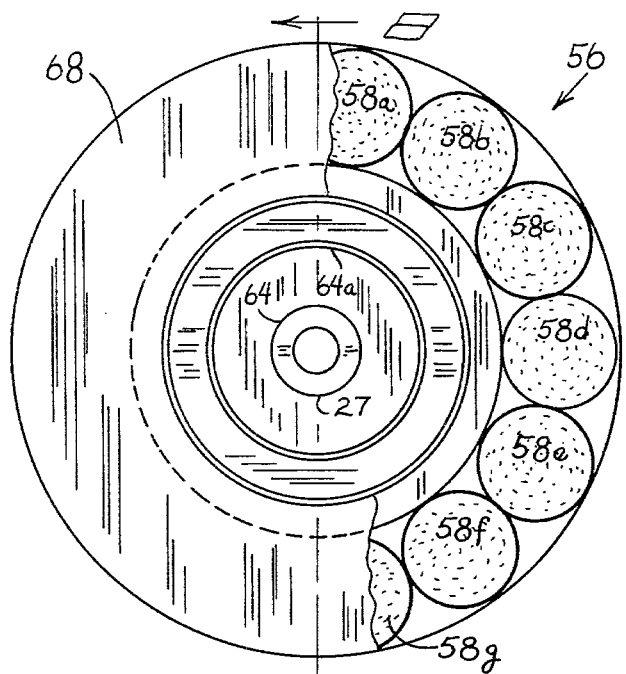
FIG. 6 illustrates a front view of a flexible-hub magnetic gyro wheel, partly in cross-section.

FIG. 1, which illustrates a front view through a pilothouse window of a towboat showing a rate of turn indicator 10, the present invention, displays a rate of turn indicator 10 on a bridge shelf 12 within view of a wheel 14 in a wheel-house 16 of a towboat. The towboat pushes a tow of barges 18a through 18L on a river 20. The tow of barges is not construed to be limited in number, and is only illustrated by way of example and for purposes of illustration only.

FIG. 2, which illustrates a side view of the present invention, shows the rate of turn indicator 10 including a forward instrument housing 22, a rearward instrument housing 24, a motor 26 having a shaft 26a and a meter 28. The motor 26 securely affixes to the top of the rearward instrument housing 24 and includes a shaft extending into the forward instrument housing 22 as later described in detail.

FIG. 3, which illustrates a front view of the rate of turn indicator 10, shows a meter 28 including a zero-center scale 28a, and a meter light 30 positioned above the meter scale 28a. A panel light brightness potentiometer control 32, a high/low sensitivity switch 34, and a meter zero-center potentiometer control 36 position on the lower portion of the forward instrument housing 22. Four screws 40a–40d secure a front panel 38 onto forward instrument housing 22 containing elements 28–36.

FIG. 4, which illustrates a cross-sectional view of the rate of turn indicator 10, shows the forward instrument housing 22 including front panel 38 secured thereto with the four screws 40a through 40d, as best illustrated in FIG. 3. The front panel 38 also supports the meter 28 and the controls 32 through 36, as illustrated in FIG. 3. Four bolts 44a through 44d extend from the rear of the forward instrument housing 22, and are secured thereto during the molding process of the forward instrument housing 22. The top bolts 44a and 44b are adjacent to support springs 46a and 46b in cavities 48a and 48b of the forward instrument housing. A rear panel 42 positions over the bolts 44a and 44b and adjustably secures thereto with wing nuts 50a and 50b. Nuts 52a and 52b affix the lower portion of the rear panel 42 to the lower portion of the forward instrument housing 22. Electromagnetic sensing coils 54a and 54b are imbedded within the forward instrument housing 22 during the molding process, as also illustrated in FIG. 5, and have electrical output wires extending outwardly towards a forward portion of the instrument housing 22, and as later described in detail in the circuit schematic of FIG. 9.

Figure 7:
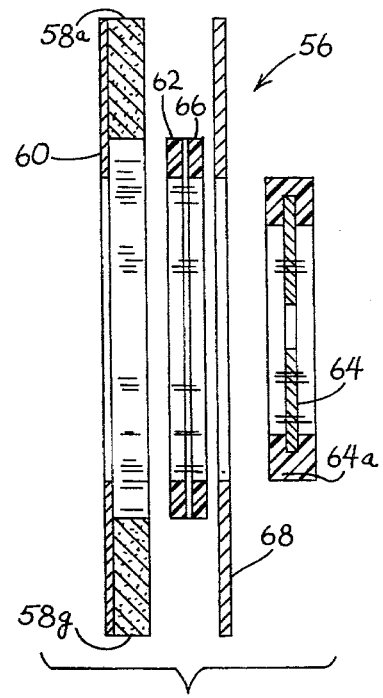
FIG. 7 illustrates an exploded end view of the magnetic gyro wheel.
Figure 8:
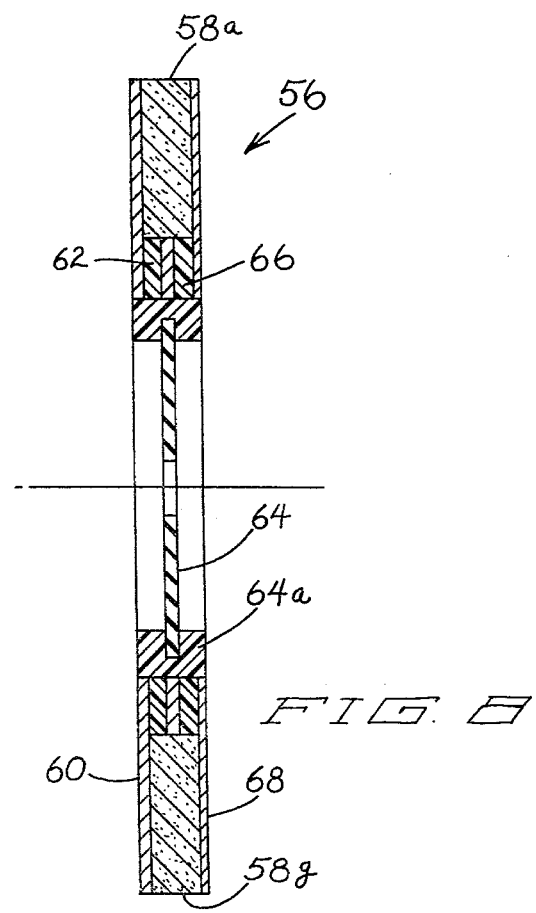
FIG. 8 illustrates an end view of the magnetic gyro wheel.

A flexible hub magnetic gyro wheel 56, later described in detail in FIGS. 6–8, includes a plurality of permanent magnets of alternating poles 58a through 58n which affix to one side of a steel ring 60, an inner aluminum ring 62, a hub 64 including properties of flexible hub material around its axis but rigid laterally and embedding in a ring 64a of plastic material or the like, a rubber spacer 66, a larger outer aluminum ring 68, a set washer 70 and set collar 72 on respective sides of the axis of the flexible-hub material 64 where the set washer 70 and the set collar 72 are secured to the shaft 26a of the motor 26. Elements 58–72 are secured to each other with adhesive or the like, and all elements provide fore and aft balance. The plastic ring secures in the inner diameter of elements 60, 62, 66, and 68 as illustrated in FIGS. 6–8. The motor 26 is supported by a rearward flange 24b of the rearward housing 24. Nuts 74a and 74b secure the forward portion 24c of the rearward housing 24 to the forward instrument housing 22, as illustrated in FIG. 4. The rearward housing 24 encloses the circuit components of the motor drive circuit, as later described in detail in the circuit schematic of FIG. 9.

FIG. 5 illustrates a cross-sectional view taken along line 5—5 of FIG. 4 where all numerals correspond to those elements previously delineated.

FIG. 6, which illustrates a plan view, partly in cross section, shows the flexible-hub magnetic gyro wheel 56 including alternating magnetic poles 58a through 58n, the steel ring 60, the inner aluminum ring 62, the flexible-hub material 64, the plastic ring 64a, the spacer 66, the outer aluminum ring 68, the set washer 70, and the set collar 72, all of the components secured to each other.

FIG. 7 illustrates an exploded end view of the magnetic gyro wheel 56 where all numerals correspond to those elements previously described.

FIG. 8 illustrates the flexible-hub magnetic gyro wheel 56 where all components are secured to each other with adhesive or like material and where all numerals correspond to those elements previously described.

Figure 9:
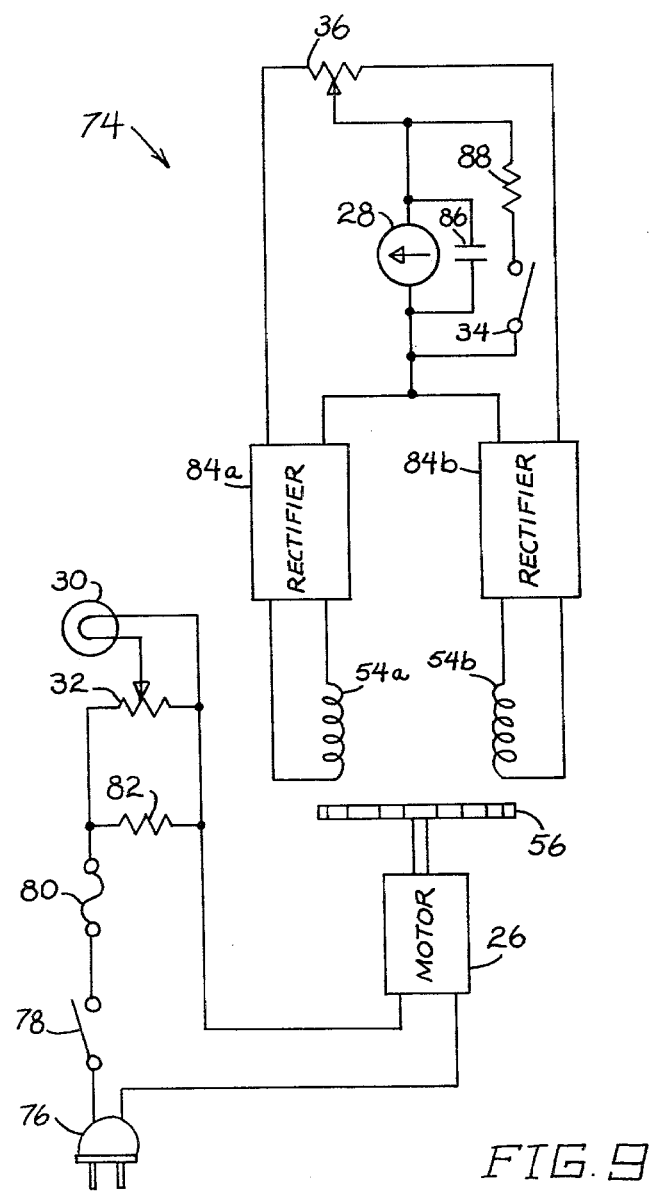
FIG. 9 illustrates an electrical schematic diagram for the rate of turn indicator.

FIG. 9, which illustrates an electrical circuit schematic diagram 74 of the electrical circuit for the rate of turn indicator 10, shows an AC plug 76, a power switch 78, and a fuse 80 connected in series. A dropping resistor 82 provides power for the panel lamp 30, the brilliance of which is adjusted by the variable resistor 32. The motor 26 is driven by the AC power through the dropping resistor 82 and subsequently drives the flexible-hub magnetic gyro wheel 56 including the plurality of permanent magnets 58a through 58n about the flexible hub 64. Coils 54a and 54b generate induced currents for bridge rectifiers 84a and 84b. The voltage induced in the coils 54a and 54b is proportional to the rate of turn of the vessel or vehicle such as a towboat 16 utilizing the rate of turn indicator 10. The bridge rectifiers 84a and 84b rectify the coil voltage to a DC voltage to operate the meter 28. The high/low sensitivity switch 34 in series with the meter shunt resistor 88 provides high and low sensitivity across the meter. The potentiometer 36 provides zero center of the meter 28.

PREFERRED MODE OF OPERATION

The rate of turn indicator 10 is positioned on a bridge shelf 12 or other like surface in the wheelhouse of a towboat 16, and the AC plug 76 is plugged into a suitable AC outlet. Switch 78 located on the rear deck 24a of the rearward housing 24 is turned on, and the meter 28 is centered with the zero-center control 36 once the flexible hub magnetic gyro wheel of the rate of turn indicator 10 has reached speed in the designated direction as determined by the motor 26.

In the event that centering of the meter 28 cannot be achieved, the wing nuts 50a and/or 50b are suitably adjusted in and out to bring the meter 28 to center. The high/low sensitivity switch 34 can be switched to either position as desired. The panel light brightness control 32 is adjusted appropriately.

In use, as the towboat is pushing a tow of barges 18, the meter 28 will indicate from center the degree of swing, however slight the swing is, providing visual indication that the tow is moving off course. This occurs as the flexible hub magnetic gyro wheel 56 radially rotates off axis about the shaft 26a due to the flexibility of the hub material 64 causing the magnets 58a–58n to induce alternating voltage in the electromagnetic sensing coils 54a and 54b. The rate of turn indicator 10 operates on the principle that as the flexible hub magnetic gyro wheel 56 rotates in a radial direction, equal voltages are induced in the electromagnetic sensing pickup coils 54a and 54b when running and no turn is being made. If the vessel begins to swing or turn in either direction from the center of the course of travel, an imbalance of voltage occurs in the pickup coils due to the radial turn of the flexible hub magnetic gyro wheel 56 causing the meter needle to swing on either side of center of the meter face 28a of the meter 28. The turn causes the flexible hub magnetic gyro wheel 56 to move closer to one of the pickup coils and farther away from the other pickup coil thereby causing an imbalance in the voltages of the two coils and also causing current of a given direction and magnitude to flow through the meter 28. Direction and magnitude of the meter current is dependent upon the direction and rate of turn. This induced voltage subsequently causes the meter 28 to indicate either a right swing or a left swing. Correction is made by the steersman of the vessel by turning the wheel 14 in the appropriate direction to bring the tow back in line on the straight course as desired.

Inherently, when a turn is made, the rate of turn indicator will indicate that a turn is being made but will also indicate the degree of angular speed of the turn and provides for visual indication of sudden swings of the tow. Hence, the rate of turn indicator 10 provides for straight steerage along a course and also provides for safety of life and property on the water.

Various modifications can be made to the rate of turn indicator of the present invention without departing from the apparent scope thereof. A disc of ferromagnetic material having alternating ferromagnetic domains can be substituted for the permanent magnets 58a–58n.

Having thus described the present invention, which is desired to be secured by Letters Patent, what is claimed is:

1. Rate of turn indicator for indicating rate of turn of a vessel from a predetermined course, said rate of turn indicator comprising:
   a. alternating current motor means, a housing including a base securing said motor means, said motor means including an axial shaft extending axially forwardly of said motor, and power supply circuit components supported on said base;
   b. electromagnetic sensing means positioned about and diametrically opposed about said shaft, an upward member secured to said base supporting said sensing means, said sensing means spaced on an axially symmetrical plane of said member;
   c. magnetic gyro wheel means including at least one ring of ferromagnetic material including a plurality of alternating poles secured and spaced about a circumferential periphery of said ring, a flexible and nonstretchable hub of material secured to said ring, a second ring of like material secured to another side of said hub, and means securing said hub to said shaft and spaced from said sensing means;
   d. adjustment means for adjusting the distance of said sensing coil means from said magnetic gyro wheel means, said adjustment means including a plurality of bolts extending rearwardly on a plurality of corners of said member, said bolts connecting to said housing, spring holes including springs positioned between said member and said housing, and a forward panel mounted on a front of said member and including an indicating means; and,
   e. signal processing means connected between said sensing coil means and said indicating means whereby said motor means rotates said magnetic gyro wheel means thereby inducing current in said signal processing means subsequently displayed on said indicating means, thereby providing a rate of turn indication.

2. Rate of turn indicator of claim 1 wherein said sensing means comprises diametrically spaced and opposed coils whereby said magnetic gyro wheel means induces currents in said spaced opposed coils.

3. Rate of turn indicator of claim 1 wherein said signal processing means includes rectifiers for converting induced alternating currents into direct current.

4. Rate of turn indicator of claim 1 wherein said indicating means comprises a zero-center meter whereby said signal processing means connects to said zero-center meter thereby indicating the degree of rate of turn from a predetermined course of travel from the center of said axial shaft of said meter.

5. Rate of turn indicator of claim 1 further comprising high/low sensitivity means connected across said indicating means whereby said high/low sensitivity means adjusts the sensitivity of said indicating means.

6. Rate of turn indicator for indicating the swing of a vessel from a course comprising:
   a. an alternating current motor mounted on a base of a rear housing and having a shaft extending axially forward of said motor, and said rear housing including power supply components for said motor;
   b. forward housing including a rectangular member having diametrically spaced opposing electromagnetic sensing pickup coils spaced therein on an axially symmetrical plane, bolts extending rearwardly on four corners of said housing, two of said bolts connecting to said rearward housing, and two of said bolts extending through a rear panel, spring holes including springs positioned between said rear panel and said housing, and a forward panel mounted on a front of said forward housing and including a zero-center meter, a high/low sensitivity switch, a variable potentiometer, and a lamp brilliance potentiometer circuit; and,
   c. magnetic gyro wheel including from back to front a steel ring, a plurality of permanent magnets having alternating poles positioned around the outer periphery of said steel ring, an aluminum spacer of a smaller diameter than said steel ring, a flexible hub including axial stiffness but flexible lateral movement in a plastic member, a spacer, an aluminum ring equal in inner and outer diameter to said steel ring, said plastic member secured to said inner diameter of all of said magnetic gyro wheel elements, and a set washer and set collar on opposing axial sides of said flexible hub and positioned over said motor shaft whereby said motor shaft rotates said magnetic gyro wheel, said sensing coils connect to said zero-center meter thereby indicating a current to either side of said zero center when said magnetic gyro wheel experiences a lateral shift thereby indicating a swing of said vessel from a predetermined course.

7. Rate of turn indicator for indicating the rate of turn of a vessel from a predetermined course, said rate of turn indicator comprising:
   a. alternating current motor affixed to a base of a housing, said motor including an axial shaft extending forward of said motor, and said housing including power supply components for said motor;
   b. rectangular member secured to said housing and including diametrically spaced opposing electromagnetic sensing pickup coils spaced on an axially symmetrical plane of said member, bolts extending rearwardly on a plurality of corners of said member, said bolts connecting to said housing, spring holes including springs positioned between said member and said housing, and a forward panel mounted on a front of said member and including an indicating means connected to a signal processing means, said signal processing means connected to said sensing pickup coils; and,
   c. flexible hub magnetic gyro wheel including a ring member of ferromagnetic material including a plurality of permanent magnetic poles alternately positioned, a flexible hub secured to ring member, and a second ring of like material secured to another side of said hub material which is flexible and non-stretchable, and a set washer and set collar on opposing axial sides of said flexible hub and secured to said motor shaft whereby said motor shaft rotates said magnetic gyro wheel and said sensing coils connect to said indicating means thereby indicating when said magnetic gyro wheel experiences a lateral shift thereby indicating a swing of said vessel from said predetermined course.

8. Rate of turn indicator of claim 7 wherein said first ring and second ring of like material are magnetized with a like number of alternating poles and said poles are aligned to complement and enhance each other.

9. Rate of turn indicator of claim 7 wherein said flexible hub magnetic gyro wheel provides for said wheel to assume different angular positions with respect to said motor shaft and axis.

10. Rate of turn indicator of claim 7 wherein said flexible hub magnetic gyro wheel provides for said wheel to tilt about said motor shaft and axis and assume different angular positions with respect to said axis but restrains mass of said wheel from shifting in any angular direction outwardly from said motor shaft and axis thereby maintaining mechanical balance.

11. Rate of turn indicator of claim 7 wherein said signal processing means comprises a diode rectifier circuit.

12. Rate of turn indicator of claim 7 wherein said indicating means comprises a zero center meter.

13. Rate of turn indicator for indicating the swing of a vessel from a predetermined course comprising:
   a. alternating current motor mounted on a base of a rear housing and including a shaft extending axially forward of said motor, and said rear housing including power supply components for said motor;
   b. forward housing including a rectangular member including substantially diametrically spaced opposing electromagnetic sensing pickup coils spaced therein on a substantially axially symmetrical plane, bolts extending rearwardly on four corners of said housing, two of said bolts connecting to said rearward housing and two of said bolts extending through a rear panel, spring holes including springs positioned between said rear panel and said housing, and a forward panel affixed on a front of said forward housing and including an indicating means; and,
   c. flexible hub magnetic gyro wheel including a disc ring of ferromagnetic material and including a plurality of alternating ferromagnetic domains, a flexible hub included disposed therein, said flexible hub including flexibility and non-stretchability, and a set washer and set collar on opposing axial sides of said flexible hub, said set collar secured to said motor shaft whereby said motor shaft rotates said flexible hub magnetic gyro wheel, said sensing coils connect to said indicating means thereby indicating a swing to either side of said axis when said flexible hub magnetic gyro wheel experiences a lateral shift thereby indicating a swing of said vessel from said predetermined course.

14. Rate of turn indicator of claim 13 wherein said indicating means is a zero center meter.

* * * * *